F. G. POTHIER.
AUTOMOBILE FENDER.
APPLICATION FILED APR. 7, 1914.
1,142,456.
Patented June 8, 1915.
2 SHEETS—SHEET 1.
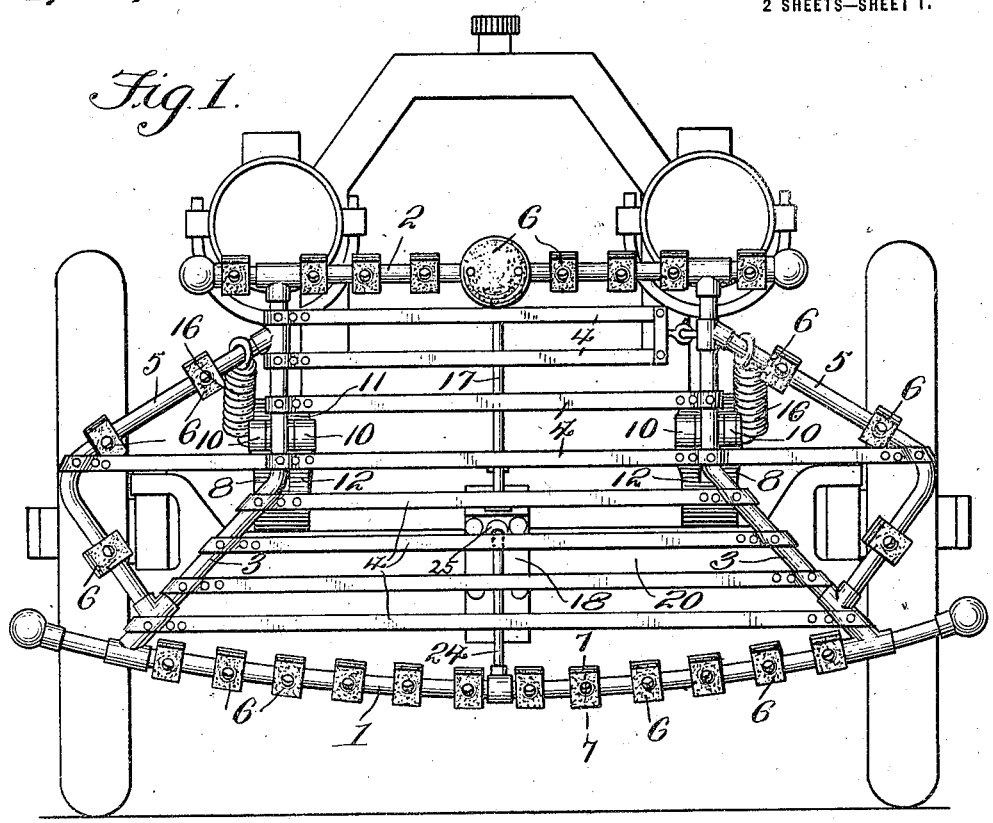
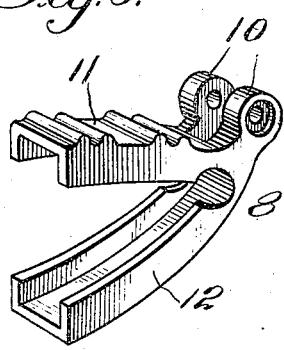
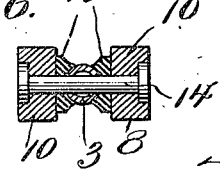
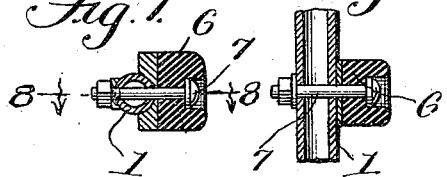
Witnesses
J. T. L. Wright
V. B. Hillyard
Inventor
F. G. Pothier
By Victor J. Evans
Attorney

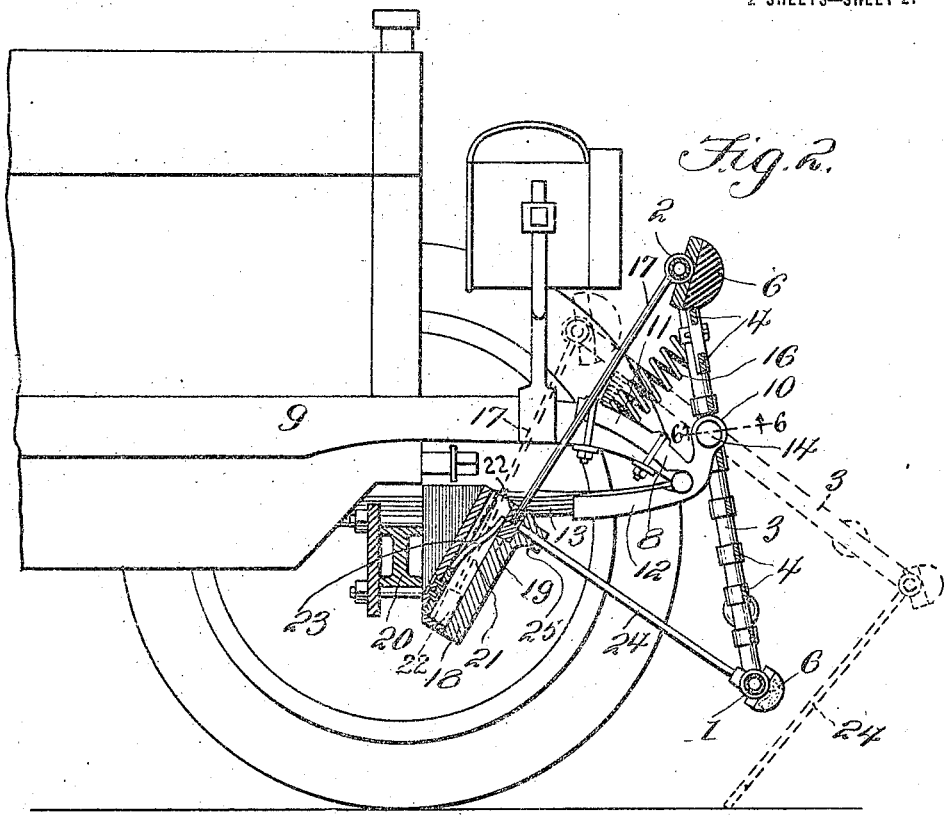
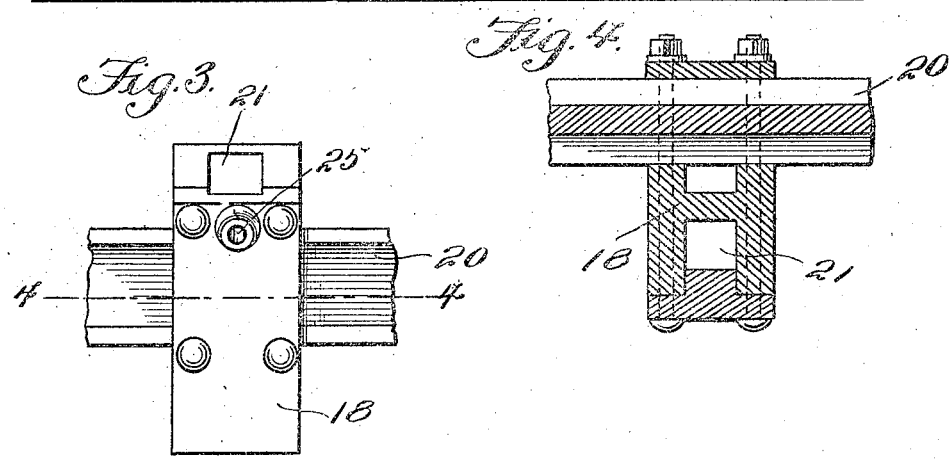

UNITED STATES PATENT OFFICE.

FREDERICK G. POTHIER, OF ELMIRA, NEW YORK.

AUTOMOBILE-FENDER.

1,142,456.  Specification of Letters Patent.  Patented June 8, 1915.

Application filed April 7, 1914. Serial No. 830,238.

*To all whom it may concern:*

Be it known that I, FREDERICK G. POTHIER, a citizen of the United States, residing at Elmira, in the county of Chemung and State of New York, have invented new and useful Improvements in Automobile-Fenders, of which the following is a specification.

The primary purpose of this invention is the provision of a safety appliance for vehicles generally and automobiles in particular, to prevent serious injury to a pedestrian who may be struck by the vehicle or machine when in motion.

The invention has for its object a fender which is so arranged as to trip a pedestrian when struck so as to throw the person upon a net whereby such person is lifted clear of the ground and carried along with the vehicle, thereby preventing any possibility of the person getting beneath the wheels or vehicle so as to be injured as a result of the collision.

A further purpose of the invention is the provision of a fender which normally occupies a position so as not to extend in front of the vehicle so as to offer an obstruction or detract from the appearance of the vehicle and which fender is released by impact with an object to cause such object to be lifted and thrown upon the fender to be carried thereby along with the vehicle.

The invention also provides a fender which is normally held in a given position by restraining means which are adapted to be released by the force of impact between the fender and an object in the event of a collision, and springs for moving the fender to trip the person whereby the object struck is lifted and carried along with the vehicle.

The invention also further provides a fender which may be readily fitted to any ordinary make of machine or motor vehicle so as to prevent a serious accident, should a person be struck by the machine when in motion.

The invention consists of the novel features, details of construction and combination of parts, which hereinafter will be more particularly set forth, illustrated and claimed.

In the drawings hereto attached:—Figure 1 is a front view of a motor vehicle of the automobile type provided with a fender embodying the invention. Fig. 2 is a side view, partly in section, the full lines showing the normal position of the fender and the dotted lines the position assumed by the fender when released by striking an object. Fig. 3 is a front view of the guide and part of the front axle to which such guide is attached. Fig. 4 is a horizontal section of the guide and axle on the line 4—4 of Fig. 3. Fig. 5 is a detail perspective view of one of the brackets for attaching the fender to a side bar of the machine frame. Fig. 6 is a sectional detail on the line 6—6 of Fig. 2, looking upward as indicated by the arrow. Fig. 7 is a detail section of the impact bar on the line 7—7 of Fig. 1, and Fig. 8 is a horizontal section on the line 8—8 of Fig. 7.

Corresponding and like parts are referred to in the following description, and indicated in all the views of the drawing, by the same reference characters.

The fender comprises a main body portion or net and sides or wheel guards, said fender being pivotally supported and normally occupying a position so as not to extend too far in advance of the vehicle, but which fender, when struck, is released by the force of the impact to admit of springs coming into play to move the fender so as to lift the object and carry the same along with the vehicle. The main body or net portion of the fender comprises a frame and a filling extending across the space between the bars or members comprising such frame.

As shown most clearly in Fig. 1, the frame comprises a lower bar 1, an upper bar 2 and side bars 3. The lower bar 1, by reason of its function, is designated as an impact bar, since in the event of a collision it comes in contact with the object and receives the force of the impact. This impact bar 1 curves throughout its length and extends beyond the tread of the wheels and terminates in enlarged ends which give a finished appearance to the bar and prevent injury to an object coming in contact with such extremities. The upper bar 2 is preferably straight and is much shorter than the impact bar and terminates within the tread of the wheel. The side bars 3 are of similar formation, and comprise upper parallel portions and lower flared portions which are secured in any manner to the end portions of the impact bar 1. The filling is of a nature to prevent injury to the person, and preferably consists of straps, tapes, cords or like flexible connections 4, which are properly spaced and are secured at their ends to the side bars 3. The fender is arranged so as normally to occupy an upright position, inclining slightly toward the rear at its upper end, thereby throwing the lower portion forward and bringing the impact bar 1 in position to come in contact with an object in the path of the vehicle in the event of a collision. Side or wheel guards 5 are arranged at the sides of the fender and extend in front of the wheels and serve to prevent a person falling against such wheels when tripped by the fender. The side or wheel guards are of similar formation, each consisting of a substantially V-shaped bar which has its ends secured in any manner to the end portions of the side bars 3. The guards 5 are located opposite the angles formed between the upper and lower portions of the side bars 3.

To prevent injurious contact of the person with the bars forming members of the fender, buffers 6 are secured to the several bars, such buffers being preferably of rubber or other yieldable material, and secured to the bars by means of bolts or like fastenings 7, the heads of which are concealed within the material forming such buffers to prevent injurious contact with the person. It has been found not to be necessary to provide the side bars 3 with buffers because the straps or like filling 4 answer the purpose to receive the force of the blow and thereby prevent injury to the person coming in contact with such side bars.

The fender is pivotally connected to the frame of the machine, preferably at a point between its upper and lower edges.

As shown, a bracket 8 is attached to the nose or front portion of each longitudinal or side bar 9 of the machine frame, such bracket having upwardly extending lugs 10 between which the side bars 3 of the fender are pivotally mounted. Each of the brackets 8 comprises an upper member 11 and a lower member 12, such members being channeled upon their inner faces to embrace opposite sides of the bars 9 and front springs 13. The brackets 8 are clipped or otherwise secured by means of the upper members 11 to the side bars 9. The side bars 3 of the fender pass between the lugs 10 and are mounted upon pivot fastenings 14 which pass transversely through openings formed in the lugs 10. Washers 15 are located between the lugs 10 and side bars 3 to prevent rattle and play, such washers being preferably of rubber or other like material. Helical contractile springs 16 are interposed between the upper portion of the fender and the frame of the vehicle and when released move the fender into the position indicated by dotted lines in Fig. 2.

When the fender is in the position indicated by full lines in Fig. 2, the springs 16 are under tension, the fender being normally held in upright position by restraining means which, when tripped by the force of impact between the fender and an object when collision occurs, permits the springs 16 to come into play to move the fender from the full line position of Fig. 2 to the dotted line position, with the result that the object struck is lifted from the ground and carried along with the vehicle.

The fender restraining means consist of a rod 17, guide 18 and stop 19. The guide 18 is secured to any convenient part of the vehicle, such as the axle 20, and normally occupies an inclined position to the vertical. The guide 18 is formed with a passage or way 21 in which the lower end of the rod 17 is adapted to move.

A head 22 is provided at the lower end of the rod 17 and is adapted to operate in the guide way 21 and is adapted to engage the stop 19 near the upper end of such guide way so as to hold the fender in normal position, as indicated by the full lines in Fig. 2.

A spring 23 arranged within the guide way 21, which is secured at its lower end to the guide 18, exerts a pressure upon the head 22 to normally hold the same in engagement with the stop 19, thereby preventing displacement of such head by shock or vibration incident to the usual movement of the vehicle.

The trip for disengaging the head 22 from the stop 19 consists of a rod 24, which is pivoted at its lower end to the impact bar 1, and has its upper end arranged to operate in an opening 25 formed in the front side of the guide 18 and in position to engage the head 22. When the impact bar 1 strikes an object, the rod 24 moves rearward and disengages the head 22 from the stop 19, whereupon the springs 16 come into play and draw the upper portion of the fender downward and rearward, thereby lifting the lower portion of the fender, which is thrown upward and forward. In the event of the object being a person, such person is tripped and thrown upon the fender and is carried along thereby with the vehicle. When the person is tripped, he or she is at the same time lifted from the ground, thereby preventing any injury resulting from jamming the person between any part of the vehicle and the surface over which such vehicle may be moving.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In combination, a pivotally mounted fender normally arranged to occupy an upright position, spring means for moving the fender from a normal position when released, restraining means for the fender including a guide having a stop and a rod, and a trip actuated by impact of the fender with an object to release the rod from the said stop, whereby the spring means are adapted to come into play.

2. In combination, a pivotally mounted fender, spring means actuating such fender, a guide having a stop, a rod connected with the fender and adapted to engage such stop to normally hold the fender in given position against the action of the spring means and a trip effecting release of the rod from the stop.

3. In combination, a pivotally mounted fender, spring means actuating such fender, a guide having a stop, a rod connected with the fender and adapted to engage such stop and a trip rod connected with the fender and adapted to effect release of the first mentioned rod from the stop.

4. In combination, brackets, a fender pivotally connected to such brackets, spring means coöperating with the fender, a guide having a stop, a rod connected with the fender and adapted to engage such stop and a trip rod connected with the fender and adapted to effect the release of the first mentioned rod from the stop.

5. In combination, a pivotally mounted fender, spring means actuating such fender, a guide having a stop, a rod connected with the fender and adapted to engage such stop to normally hold the fender in given position against the action of the spring means, means for retaining the rod in contact with said stop, and a trip effecting release of the rod from the stop.

6. In combination, a pivotally mounted fender, spring means actuating such fender, a guide having a stop, a rod connected with the fender and adapted to engage such stop to normally hold the fender in given position against the action of the spring, and means arranged longitudinally of the guide and having its free terminal abutting against the rod for retaining the latter in contact with said stop, and a trip effecting release of the rod from the stop.

7. In combination, a pivotally mounted fender, spring means actuating such fender, a guide having a stop, a rod connected with the fender and adapted to engage such stop to normally hold the fender in given position against the action of the spring means, means for retaining the rod in contact with said stop, said last named means preventing the displacement of the rod from said stop by the shocks or vibration of the vehicle, and a trip effecting release of the rod from the stop.

8. In combination, a pivotally mounted fender, means actuating such fender, a guide having a guide-way, a stop arranged within the guide-way of the guide, a rod connected with the fender and adapted to engage such stop to normally hold the fender in given position against the action of the first mentioned means, means disposed within the guide-way of the guide for retaining the rod in contact with said stop, and a trip effecting release of the rod from the stop.

9. In combination, a pivotally mounted fender, means actuating such fender, a guide having a guide-way, a stop arranged within the guide-way of the guide, a rod connected with the fender and adapted to engage such stop to normally hold the fender in given position against the action of the first mentioned means, means disposed within the guide-way of the guide for retaining the rod in contact with said stop, and a trip entering the front wall of the guide in alinement with the stop for effecting the release of the rod from said stop.

In testimony whereof I affix my signature in presence of two witnesses.

FREDERICK G. POTHIER.

Witnesses:
EDWARD J. POTHIER,
FRED W. FREDENBURG.